United States Patent [19]

Aehnelt et al.

[11] Patent Number: 5,005,297
[45] Date of Patent: Apr. 9, 1991

[54] PROBE HEAD OF THE SWITCHING TYPE

[75] Inventors: Hans-Peter Aehnelt, Oberkochen; Michael Wirth, Aalen, both of Fed. Rep. of Germany

[73] Assignee: Carl-Zeiss-Stiftung, Heidenheim/Brenz, Oberkochen, Fed. Rep. of Germany

[21] Appl. No.: 451,229

[22] Filed: Dec. 15, 1989

[30] Foreign Application Priority Data

Dec. 22, 1988 [DE] Fed. Rep. of Germany ....... 3843125

[51] Int. Cl.$^5$ .............................................. G01B 7/03
[52] U.S. Cl. ........................................ 33/559; 33/556; 33/DIG. 1
[58] Field of Search ................. 33/556, 558, 559, 560, 33/561, 503, 1 M, 504, 505, DIG. 1, 568, 572, 503

[56] References Cited

U.S. PATENT DOCUMENTS

| 3,869,799 | 3/1975 | Never et al. ........................ 33/561 |
| 4,601,111 | 7/1986 | Berchtold ............................ 33/559 |
| 4,621,434 | 11/1986 | Hirschmann ........................ 33/1 M |
| 4,649,623 | 3/1987 | Schneider et al. .................... 33/561 |
| 4,815,214 | 3/1989 | Enderle et al. ....................... 33/503 |

FOREIGN PATENT DOCUMENTS 0044801 2/1989 Japan ..................................... 33/559

Primary Examiner—William A. Cuchlinski, Jr.
Assistant Examiner—William C. Dowling
Attorney, Agent, or Firm—Hopgood, Calimafde, Kalil, Blaustein & Judlowe

[57] ABSTRACT

For a horizontal orientation of a switching-type probe head, force developing device is provided to compensate for a component ($F_1$) of the gravitational weight vector ($F_g$) of the deflectably movable part (11) of the probe head, the compensating force being perpendicular to the direction of loading the movable part (11) into its at-rest (undeflected) null position in the probe head. This force-developing device is illustratively a magnetic bearing (5, 6) which is operative without involving any added mechanically contacting action within the probe head.

12 Claims, 3 Drawing Sheets

PROBE HEAD OF THE SWITCHING TYPE

BACKGROUND OF THE INVENTION

Probe heads of the switching type rely on a bearing or seat which, with high precision, fixes the null position of a deflectably movable part that carries the probe element of the probe head. The deflectable part of the probe head is pressed or pulled by a pre-loading device such as a spring; the spring provides defined force for seating in this bearing, which is generally an isostatic three-point bearing. Probe heads of this type are illustratively described in U.S. Pat. No. 4,177,568.

Probe heads of the switching type are used predominantly in an installed vertical orientation. In this case, the force of the spring which loads the seat engagement acts in the direction of gravity and acts uniformly on the three bearing points.

It is also already known to mount switching probe heads on a so-called turn-swing device, providing selective orientation of a probe via orthogonally related axes of rotation; and then to position the probe-pin in different orientations which correspond to workpiece bores to be measured. However, this is only possible if the pre-loading force to seat in the null position is much greater than the weight of the deflectable probe-pin. Otherwise, during a swinging motion of the probe head, the probe-pin may leave the null position determined by the bearing; for example, in a horizontal orientation, forces act transversely to the bearing and can unseat the probe-pin and its carrier, out from the bearing.

On the other hand, if greater pre-loading force is provided to assure null-position seating when the probe-pin is horizontally oriented, there will necessarily be greater work-contacting forces, as well as an increase in bearing friction. Increased friction significantly impairs the precision with which the probe-pin returns into its null position after performing a workpiece-contacting procedure. Furthermore, high workpiece-contacting forces are generally undesired for many measurement tasks.

Although this problem can still be compensated by increasing the pre-loading force within certain limits, for a probe head of relatively small diameter and mounting a probe-pin of only slight mass, such compensation is no longer possible for switching heads of larger construction.

BRIEF STATEMENT OF THE INVENTION

The object of the present invention is to provide a probe head of the switching type which can support probe-pins of relatively large mass and, in particular, can be used also in a horizontal orientation without impairing reproduceability of the null position.

The invention achieves this object by providing within the probe head a device which is operative without reliance on mechanical contact and which compensates for gravitational forces acting on the movable part of the probe head, wherein the compensating device supplies force acting perpendicular to the direction of pre-loading the movable part to its null position.

In this way, the result is obtained that the sum of all forces which hold the probe-pin and/or its carrier in its seated null position act solely in the seating direction, i.e., toward the bearing points, in the same way as has to date been the case for a vertically oriented probe-head situation. Therefore, without impairing repetitive accuracy of the probe, one can operate in orientation other than vertical, with small pre-loading forces and, accordingly, small contacting forces. Furthermore, since the device for compensating for gravitational weight operates without mechanical contact, one avoids the additional frictional forces which would otherwise occur if, for example, the gravitational weight compensation were effected by additional springs acting on the probe-pin carrier.

Illustratively, either a magnetic bearing or an air bearing can provide for weight compensation, free of mechanical-contact involvement. In either case, the non-contact bearing can be so designed that this additional device does not impede deflection of the probe-pin of the probe-pin carrier, during the course of a scanning procedure.

Moreover, if the gap of the bearing in question is also adjustable, then weight compensation can be effected (in the plane perpendicular to the direction of the pre-loading) as a function of the weight of the involved probe-pin combination or as a function of the orientation of the probe head, i.e. as a function of its angular position with respect to the vertical.

DETAILED DESCRIPTION

Further advantages of the invention will be evident from the following description, in conjunction with the accompanying drawings, in which.

Figure 1:
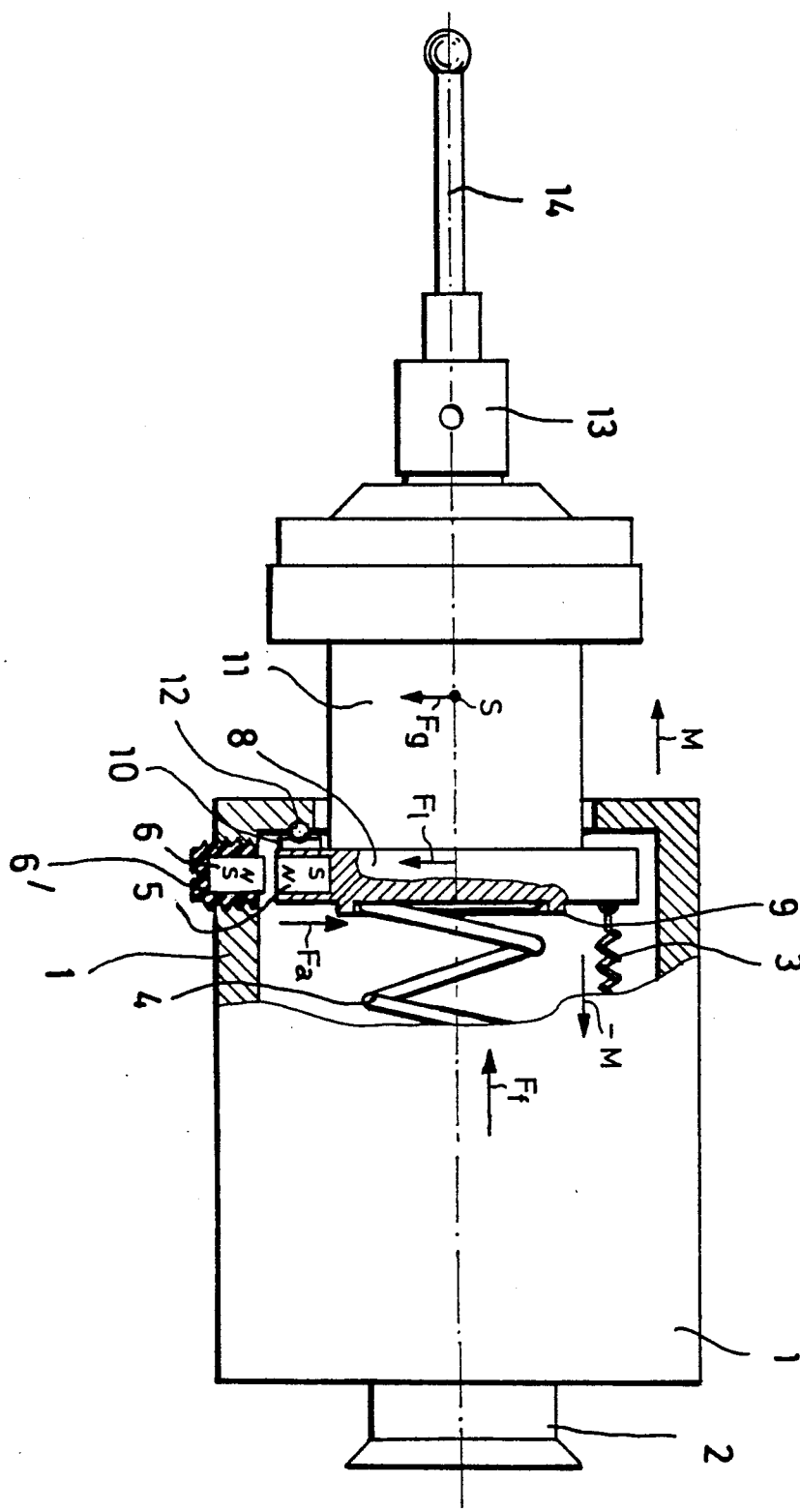
FIG. 1 is a view in side elevation, partly broken away and in longitudinal section, showing a first probe-head embodiment of the invention, in a horizontal orientation.

The probe head of FIG. 1 has a cylindrical housing 1 having at its front end a formation 2 via which the probe head can be mounted on the measurement arm of a coordinate-measuring machine (not shown). At the end opposite the mount formation 2, housing 1 is open within a cylindrical collar or flange, the inner radial surface of which mounts a bearing consisting of three angularly spaced pairs of balls; the bearing plate 8 of the movable part 11 of the probe head has self-centering fit to these pairs of balls when in its null or at-rest position. In FIG. 1, only one ball of one of the three pairs of balls of the bearing, namely the ball 12, can be seen. Each ball pair defines a notch, and the three notches are arranged 120° apart with respect to the longitudinal axis of the probe head; each notch locates one of three cylindrical bodies 10, which are fixed to the bottom side of the plate 8. This known arrangement of pairs of balls and cylindrical bodies establishes a three-point bearing which reproduces with high precision the null position of a probe-pin 14, which is shown mounted to the probe head via a chucking device 13 on the movable pin-carrier part 11.

A coil spring 4 resiliently preloads the probe-pin carrier 11 via plate 8 into seated location in the three-point bearing. In this connection, the pre-loading force $F_f$ acts in the direction of the longitudinal axis of the probe head, which axis is shown by a dot-dash alignment in the drawing.

In the horizontal orientation shown, the three-point bearing in the probe head is also subject to gravitational weights and moments in directions which do not coincide with the longitudinal axis of the probe-pin. Thus, the gravitational weight $F_g$ which acts at the center of gravity S of the movable part 11 produces a force component $F_l$ in the plane of the three-point bearing, as well as a moment M; the result is to load the two upper points (not shown) of the three-point bearing more strongly than the lower bearing point (shown at 10, 12). These components of force are now compensated by the following means:

A magnet 5 is fitted in the lower end of the bearing plate 8 of the probe-pin carrier, and an opposing magnet 6 is fitted to the probe head housing 1 at the corresponding location. The gap between these two magnets is so selected that, with identical poles facing each other across the gap, a repulsion force $F_a$ develops, equal and opposite to the force component $F_l$, it being recalled that force $F_l$ acts in the plane of the three-point bearing and that it is a force component of the weight vector $F_g$.

Furthermore, at the upper end of the bearing plate 8, a tension spring 3 is referenced to the housing 1, to relieve the bearing of incremental load at this location, and the tension force of spring 3 is selected to develop a moment ($-M$) which is opposite and equal to the moment M resulting from the weight vector $F_g$. In this way, all components of force which are the result of horizontal orientation are compensated, so that the resultant total force is once again only the loading force $F_f$ of the spring 4 which urges the movable part 11 in the direction of the longitudinal axis of symmetry, i.e. toward its seated or null position in the three-point bearing.

Neither the magnets 5, 6 nor the tension spring 3 can impede the deflection of part 11 in the course of a workpiece-contacting procedure.

Figure 2:
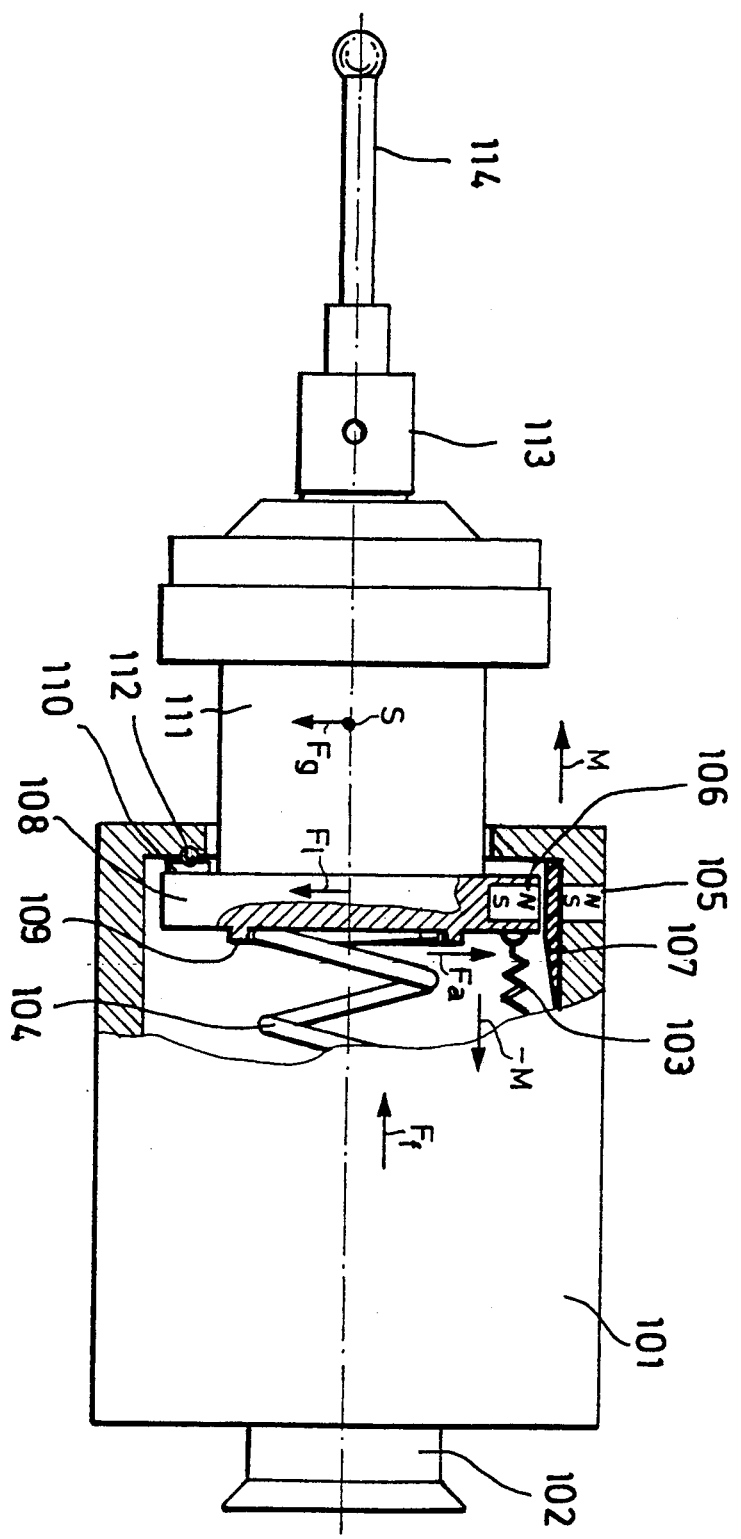
FIG. 2 is a view similar to FIG. 1, for a second embodiment of the invention.

In the embodiment of FIG. 2, the probe head differs from that of FIG. 1 solely by the fact that, instead of the repulsion magnets (5, 6), two attraction magnets 105, 106 are fitted to the upper end of the horizontally oriented probe-head housing 101 and to the bearing plate 108 respectively. The other parts of the probe head of FIG. 2 have the same function as in FIG. 1 and are provided with reference numbers which are greater, by 100 than those of FIG. 1. These other parts therefore need no further explanation.

In addition, a spacer 107 of non-magnetic material, such as a plastic material, is inserted between the two magnets 105, 106. The spacer 107 serves to prevent magnets 105, 106 from sticking to each other. Assurance is thus provided that, after each workpiece-contacting procedure, the movable part 111 of the probe head will again return to its null position in the three-point bearing.

In the event that probe-pins of different weight are to be chucked to the probe heads shown in FIGS. 1 and 2, it may be advisable to make the distance between the magnets 5 and 6 (105 and 106) adjustable. This can be done, for example, by mounting one or both of the magnets 6 and 105 (or 5 and 106) via an adjustment screw, as suggested at 6, for magnet 6 in FIG. 1.

Figure 4:
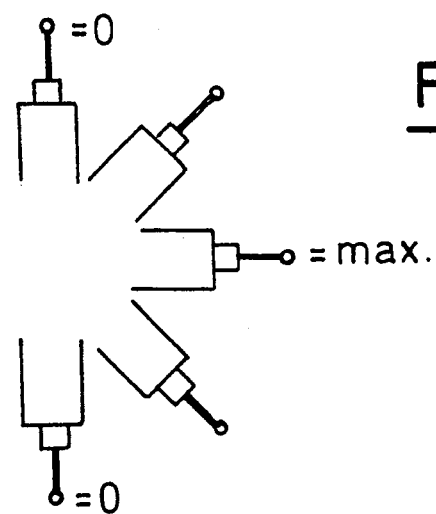
FIG. 4 is a simplified sketch to show the probe head of FIG. 3 in a succession of different orientations.

An adjustment of the magnetic gap is also to be provided for the event that the probe head is mounted, for example, on a two-axis turn-swing device and is used in different orientations. In this case, the size of the force component in the plane of null-position seating and perpendicular to the spring-loading direction, which force component is to be compensated by magnetic means, is dependent on the angular position of the probe head with respect to the vertical; this force component varies between a maximum value for horizontal orientation of the probe head and a value of 0 for vertical orientation, as shown in the sketch of FIG. 4.

Figure 3:
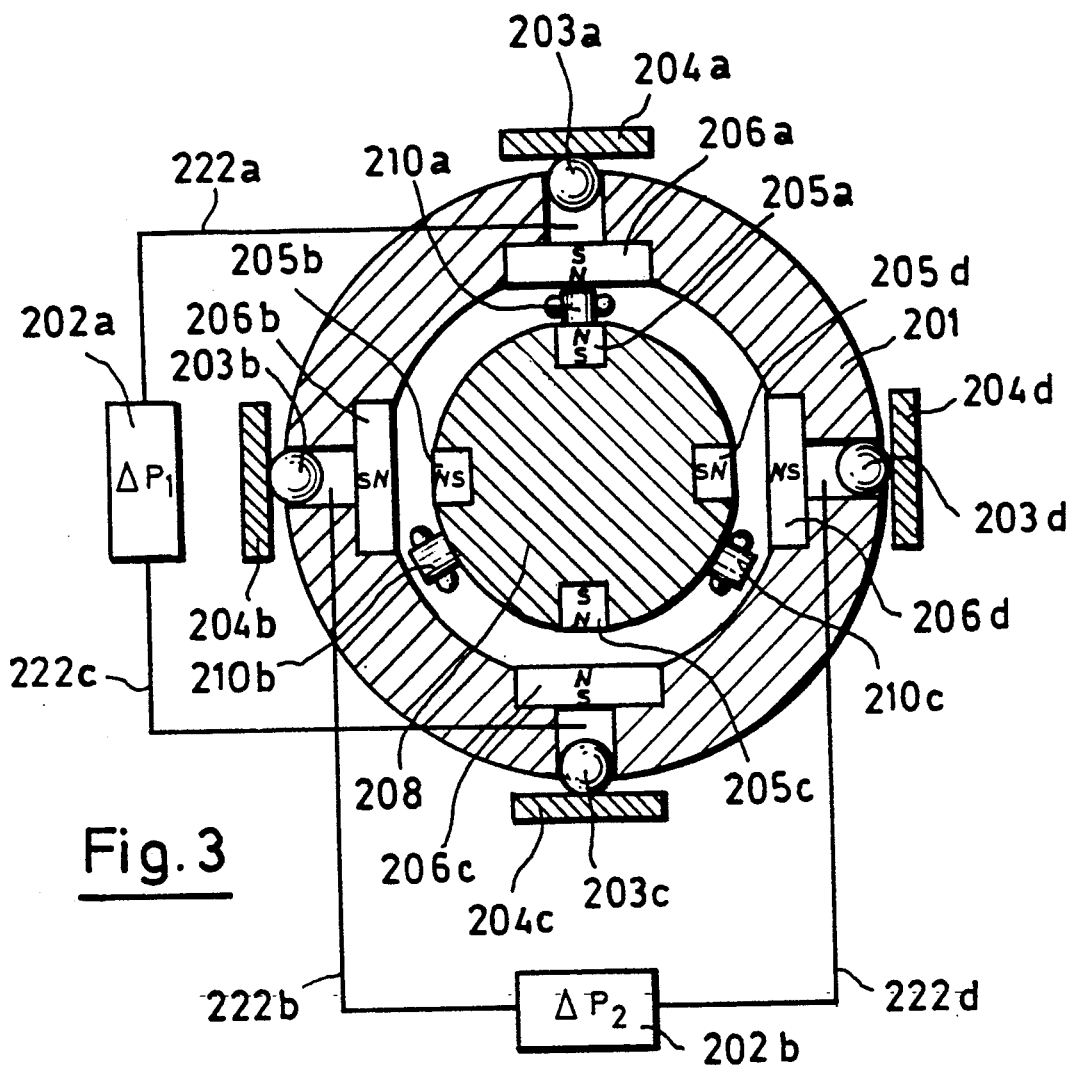
FIG. 3 is a transverse section of another probe-head embodiment of the invention, as seen in a plane perpendicular to the direction of pre-loading the movable element to its seated or null position.

A embodiment which permits adjustment of compensating force as a function of probe-head orientation is shown in FIG. 3. This embodiment also assures that the compensation can even occur for any rotated position of the probe head about its longitudinal axis.

More specifically, within the probe-head housing (not shown in FIG. 3), a ring 201 is provided with four bored radial holes, arranged 90° apart, thus providing two pairs of diametrically opposed radial holes, in quadrature spaced relation. Ring 201 is free to float with respect to the movable bearing plate 208 of the probe-pin carrier, and each of the bored holes guides a ball (203a-d). These balls (203a-d) are piston elements of different pneumatic circuits and are pressure driven into continuous contact with outer flat abutments (204a-d) in the probe-head housing. The inner ends of the bore holes are closed by four inserted magnets (206a-d). Opposite these magnets (206a-d), four magnets (205a-d) are arranged with like opposing poles in the movable plate 208. The three-point bearing (210a-c) via which the probe-pin carrier locates in the probe housing can also be noted in FIG. 3.

For each pair of diametrically opposed holes in ring 201, individual pneumatic lines (222a, 222c; and 222b, 222d) are respectively connected to valve means (202a and 202b), via which a computer-specified pressure difference ($\Delta P1$ and/or $\Delta P2$) is established between the inner volumes of the holes of each pair, as determined by computer-operated control means (not shown) of the coordinate-measuring instrument. Based on pressure differences thus determined, the ring (201) moves in desired manner with respect to the movable plate 208 and therefore with respect to the probe-pin carrier. As a result, the bearing gaps of the magnetic bearings change, as well as the forces exerted by the magnets on the movable part 208. By suitable control of the pressure differences $\Delta P1$ and $\Delta P2$, the compensating force transverse to the pre-loading direction of the three-point bearing (210a-c) can thus be adjusted in amount and direction in the plane of the three-point bearing, all as a function of instantaneous orientation of the probe head. In this connection, the magnitude of the gravitational weight force is determined by the sum of the two differential pressures $\Delta P1$ and $\Delta P2$, and the direction of the compensating force in the plane of the bearing is determined by the quotient $\Delta P1/\Delta P2$ of the differential pressures.

We claim:

1. A probe head of the switching type, wherein a housing has a self-centering bearing for a movable part which is adapted to carry a work-contacting probe element, whereby the movable part and a probe element carried thereby present at said bearing a given gravitational weight ($F_g$); and wherein the movable part is held in a defined null position in said bearing by resilient loading means acting in the direction ($F_f$) toward said bearing, whereby for probe-head orientation in which the direction ($F_f$) of resilient loading is other than gravitationally vertical, said gravitational weight ($F_g$) establishes a force component ($F_l$) which acts perpendicular to the direction of resilient loading; and spaced noncontacting but magnetically reacting elements carried by the housing and by the movable part, said magnetically reacting elements being positioned to react perpendicular to the direction ($F_j$) of resilient loading and with a compensating magnetic-reaction force ($F_a$) in opposition to said force component ($F_l$).

2. A probe head according to claim 1, in which at least one of said magnetically reacting elements includes means for selective adjustment of the space between said magnetically reacting elements.

3. A probe head according to claim 1, in which said non-contacting magnetically reacting elements comprise two spaced magnets which are poled for mutual repulsion.

4. A probe head according to claim 1, in which said non-contacting magnetically reacting elements comprise two spaced magnets which are poled for mutual attraction.

5. A probe head according to claim 4, further comprising a non-magnetic spacer (107) retained in the space between said magnets.

6. A probe head according to claim 1, wherein said magnetically reacting elements are in angularly spaced pairs so mounted about the direction ($F_j$) of resilient loading as to provide, for each pair, a directional magnetic-reaction force that is generally radially directional in a plane perpendicular to the direction ($F_j$) of resilient loading, and means responsive to instantaneous orientation of the probe head for so varying the spacing of magnets in each pair as to provide a net magnetic-reaction force ($F_a$) in opposition to the instantaneous force component ($F_l$) of the gravitational weight ($F_g$).

7. A probe head according to claim 6, wherein an adjustment ring within said housing and surrounding a portion of said movable part is free to float eccentrically with respect to said housing and with respect to said movable part, with one magnetic element of each pair being carried by said ring and the other magnetic element of each pair being carried by said movable part, said means responsive to instantaneous orientation of the probe head being operative to eccentrically displace said ring with respect to said movable part to thereby so vary the spacing of magnets in each pair as to establish said net magnetic-reaction force ($F_a$) in opposition to the instantaneous force component ($F_l$) of the gravitational weight ($F_g$).

8. A probe head according to claim 7, wherein there are four pairs of magnetically reacting elements, said pairs being arrayed in quadrature spacing about the direction ($F_j$) of resilient loading.

9. A coordinate-measuring machine having a movable measurement arm and a switching-type probe-head mounted to said arm and programmable control means for moving said arm and its probe head in an automated program of probe-pin contacts with a workpiece to be measured, said probe head comprising a probe-head housing having a longitudinal axis, and a movable member for deflectably mounting a probe-pin with respect to said housing, loading means operative to provide a seating force along said axis for normally and yieldably retaining the movable member in precisely seated relation to said housing and centered on said axis, in readiness to generate an electrical signal upon probe-pin contact with a workpiece, said seated relation being established in a plane normal to said axis, whereby for a probe-head orientation other than with said axis gravitationally vertical, gravitational force attributable to said movable member and to the probe pin mounted thereto is present to eccentrically alter the loading force of seating the movable member, and means including at least one pair of spaced polarized magnets reacting between said housing and said movable member and substantially in said plane and normal to said axis for opposing the eccentric alteration.

10. A probe head comprising a probe-head housing and a movable member for deflectably mounting a probe-pin with respect to an at-rest position of the probe pin relative to the housing, said probe head being adapted for attachment to a coordinate-measuring machine via a mount which is operable to variously orient the housing and thus to vary at-rest orientation of the probe-pin that is deflectably mounted to said housing, loading means normally and yieldably retaining the movable member in precisely seated relation to said housing, wherein the seated relation involves three angularly spaced points of support in a single plane that is normal to a central axis of seating-force action by said loading means, at least one pair of polarized magnets wherein one magnet of the pair is carried by said movable member and the other magnet of the pair is referenced to said housing, said magnets being mounted in such poled relation to each other as to establish a magnetic-reaction force which is substantially in said plane and normal to said axis.

11. A coordinate-measuring machine having a movable measurement arm and a switching-type probe-head mounted to said arm and programmable control means for moving said arm and its probe head in an automated program of probe-pin contacts with a workpiece to be measured, said probe head comprising a probe-head housing having a longitudinal axis, and a movable member for deflectably mounting a probe-pin with respect to said housing, loading means operative to provide a seating force along said axis for normally and yieldably retaining the movable member in precisely seated relation to said housing and centered on said axis, in readiness to generate an electrical signal upon probe-pin contact with a workpiece, said seated relation being established in a plane normal to said axis, whereby for a probe-head orientation other than with said axis gravitationally vertical, gravitational force attributable to said movable member and to the probe pin mounted thereto is present to eccentrically alter the loading force of seating the movable member, and means reacting without mechanical contact between said housing and said movable member and substantially in said plane and normal to said axis for opposing the eccentric alteration.

12. A probe head comprising a probe-head housing having a longitudinal axis and a movable member for deflectably mounting a probe pin with respect to a seated at-rest position of the probe pin relative to the housing, said probe head being adapted for attachment to a coordinate-measuring machine via a mount which is operable to variously orient the housing and thus to vary at-rest orientation of the probe pin that is deflectably mounted to the housing, loading means normally and yieldably retaining the movable member in precisely seated relation to said housing, said seated relation being established in a plane normal to said axis, whereby for a probe-head orientation other than with said axis gravitationally vertical, gravitational force attributable to said movable member and to the probe pin mounted thereto is present to eccentrically alter the loading force of seating the movable member, and means reacting without mechanical contact between said housing and said movable member and substantially in said plane and normal to said axis for opposing the eccentric alteration.

* * * * *